United States Patent Office 3,318,853
Patented May 9, 1967

3,318,853
OXIDIZED SHAPED ARTICLES OF TRIMETHYL-ENE SULFIDE POLYMERS
James T. Edmonds, Jr., Bartlesville, Okla., assignor to Phillips Petroleum Company, a corporation of Delaware
No Drawing. Filed Nov. 5, 1963, Ser. No. 321,412
10 Claims. (Cl. 260—79)

This invention relates to oxidized shaped articles of trimethylene sulfide polymers. In another aspect, it relates to a process for oxidizing shaped articles of trimethylene sulfide polymers.

Many different types of resinous, plastic and elastomeric polymers have been proposed or patented and a host of these polymers are now in widespread commercial production. Recently developed moldable polymers of high molecular weight which promise to have many commercial applications are trimethylene sulfide homopolymers and copolymers of trimethylene sulfide with polymerizable vinyl-substituted comonomers, such as styrene. One factor limiting the fabrication of shaped articles of such trimethylenesulfide polymers is their relatively low melting point, e.g., 65° C. in the case of the homopolymer of trimethylene sulfide or poly(trimethylene sulfide).

Accordingly, I have discovered that the properties of shaped articles of trimethylene sulfide polymers can be improved by contacting such shaped articles, e.g., fiber, films, etc., with an oxidizing agent or compound which yields nascent oxygen. Oxidizing agents useful for this purpose are liquid peroxygen compounds, which representatively include hydrogen peroxide (the preferred agent) and peracids such as performic acid, peracetic acid, perbenzoic acid, hypochlorus acid, and the like, including combinations thereof.

As a preliminary to the oxidizing treatment, the trimethylene sulfide polymer is fabricated, formed or shaped into the desired article, such as fibers, films, containers, etc., by such well known techniques as extrusion, injection molding, blow molding, solution casting, melt spinning and solution spinning. For example, in the case of fibers, the trimethylene sulfide polymer can be dissolved in a highly polar, organic solvent such as N-methylpyrrolidone and the resulting solution spun into fibers. The shaped articles can be subjected to various processing steps prior to the oxidizing treatment to improve their mechanical properties. For example, in the case of fibers, the fibers can be cold drawn to develop maximum tensile strength through orientation.

The oxidizing treatment of the shaped trimethylene sulfide polymer can be carried out in general by any suitable contacting of the polymer with the oxidizing agent. The treatment can be carried out by immersing the article in a diluent or bath, such as water, acetic acid, or other liquid, which facilitates the contact of the oxidizing agent with the trimethylene sulfide polymer, at a temperature below that at which the polymer will dissolve in the diluent, which will usually be below 50° C. I prefer to carry out the oxidizing treatment using acetic acid as the diluent or bath, particularly when hydrogen peroxide is used as oxidizing agent. The use of aectic acid will result in a vigorous oxidation reaction through the in situ formation of peracetic acid. The oxidizing treatment results in converting at least a portion of the sulfur groups in the polymer to sulfoxide groups and/or sulfone groups, depending upon how much oxidizing agent is used. The reaction time for the oxidizing treatment can vary widely, and will be dependent upon the amount of oxidizing agent used, the diluent used, and the cross sectional area of the article. Usually, with small cross sectional area articles such as fibers and films the reaction time will generally be less than 30 minutes.

In general, the amount of oxidizing agent used is that which will modify the polymer and increase the melting point thereof. Usually, from 0.2 to 5 moles of oxidizing agent will be used per gram atom of sulfur present in the polymer being treated. If one mole of oxidizing agent per atom of sulfur in the polymer enters into the reaction, essentially all of the sulfur atoms will be converted to sulfoxide groups before sulfone groups are produced, yielding a trimethylene sulfoxide polymer. Where more than one mole of oxidizing agent is used per gram atom of sulfur in the polymer, sulfur groups will be converted to sulfone groups. When two moles of oxidizing agent are used per gram atom of sulfur, essentially all of the sulfur atoms in the polymer will be converted to sulfone groups, thus yielding a trimethylene sulfone polymer. If more than two moles of oxidizing agent are used per gram atom of sulfur, the trimethylene sulfone polymer will be produced, the excess oxidizing agent serving to speed up the oxidizing reaction.

The trimethylene sulfide polymers which are shaped and oxidized according to this invention can be prepared by known polymerization reactions in the presence or absence of a polymerization diluent and in the presence of catalysts such as organo-alkali metal compounds, e.g., n-butyllithium, alkali metals, e.g., sodium, and acid type catalysts, e.g., $BF_3$, $AlCl_3$, $H_2SO_4$ and $HF$. Such polymerization reactions are generally carried out at temperatures ranging from 0 to 150° C. at autogeneous pressure in the absence or the presence of such diluents as ethers and amides. Reaction times will vary and be dependent upon the catalyst chosen and the reaction temperature, and usually will be from a few minutes to as long at 100 hours. The catalyst level will also widely vary and will be dependent upon the type of catalyst chosen. For example, where an organo-alkali metal compound such as n-butyl-lithium is used, a suitable catalyst level is from 0.25 to 100 millimoles per mole of the trimethylene sulfide. Following the polymerization reaction, the polymer is generally recovered as a precipitate by filtration or equivalent means, and is washed and dried. A preferred method of preparing these trimethylene sulfide polymers is that disclosed and claimed in my copending application (Case 13200), filed Sept. 23, 1963.

The trimethylene sulfides (or thiocyclobutanes) which are homopolymerized, or copolymerized with a vinyl-substituted comonomer, can be represented by the general formula:

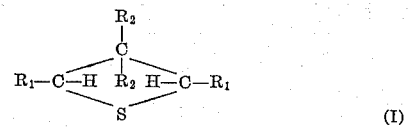

(I)

where $R_1$ and $R_2$ are radicals selected from the group consisting of hydrogen and alkyl, aryl, and cycloalkyl radicals, and combinations of said radicals, such as alkaryl, aralkyl, alkylcycloalkyl, arylcycloalkyl, cycloalkylalkyl, cycloalkylaryl, arylcycloalkylalkyl, and the like. $R_1$ and $R_2$ can contain substituent groups that are inert or unreactive in the polymerization reaction of this invention, though I prefer to employ hydrocarbon radicals as $R_1$ and $R_2$ without such substituent groups. Also, where $R_1$ is an alkyl or aralkyl radical, I prefer that such radical be a primary or secondary radical since the corresponding trimethylene sulfides will be easier to prepare in good yields. And I prefer that where $R_1$ and $R_2$ are hydrocarbon radicals that the number of carbon atoms in each be in the range of 1 to 10, inclusive, and that the total number of carbon atoms in the trimethylene sulfide compound does not exceed 15.

The trimethylene sulfides and their preparation are known in the prior art, and the simplest member of this class, viz., trimethylene sulfide (or thiacyclobutane), is the preferred member of the class to be used in making the polymers of this invention, especially since it is presently commercially available. This latter compound can be prepared by the reaction of 1,3-dichloro- or 1,3-dibromopropane with sodium sulfide. Another method of preparing it, and other members of the class, is by reacting a 3-chloropropyl mercaptan with a base such as sodium hydroxide.

Representative trimethylene sulfides coming within the scope of the Formula I which can be used in the practice of this invention include:

trimethylene sulfide,
2-methyltrimethylene sulfide,
3-methyltrimethylene sulfide,
2,3-dimethyltrimethylene sulfide,
2,4-dimetyltrimethylene sulfide,
3,3-dimethyltrimethylene sulfide,
2,3,4-trimethyltrimethylene sulfide,
2,3,3,4-tetramethyltrimethylene sulfide,
2-ethyltrimethylene sulfide,
3-ethyltrimethylenesulfide,
3,3-diethyltrimethylene sulfide,
3-methyl-3-ethyltrimethylene sulfide,
2-methyl-3,3-diethyltrimethylene sulfide,
2-methyl-4-n-butyltrimethylene sulfide,
2,4-di-n-hexyltrimethylene sulfide,
2-sec-decyltrimethylene sulfide,
2-ethyl-3-sec-decyltrimethylene sulfide,
2-cyclopentyltrimethylene sulfide,
3-cyclohexyltrimethylene sulfide,
2,4-dicyclohexyltrimethylene sulfide,
2-(4-methylcyclohexyl)trimethylene sulfide,
2-phenyltrimethylene sulfide,
3-p-tolyltrimethylene sulfide,
2-(4-n-butylphenyl)trimethylene sulfide,
2-benzyl-3-tert-butyltrimethylene sulfide,
2-(3-cyclopentylphenyl)trimethylene sulfide,
2-methyl-3-isopropyl-4-p-tolyltrimethylene sulfide,
2-(3-phenylcyclopentyl)methyltrimethylene sulfide,
2-naphthyltrimethylene sulfide, and the like, including mixtures thereof.

As mentioned above, the trimethylene sulfides can be copolymerized with a polymerizable vinyl-substituted compound. The latter compounds include conjugated dienes, such as those having 4 to 12 carbon atoms per molecule, and compounds which can be represented by the general formula:

$$CH_2=C-A \quad\quad (II)$$
with $R_3$ above the C.

where $R_3$ is selected from the group consisting of hydrogen, lower alkyl (e.g., methyl, ethyl, propyl, etc.) and chloro, and A is selected from the group consisting of carboxy, cyano, carbamyl, carboalkoxy (e.g., carbomethoxy, carboethoxy, carbopropoxy, etc.) and the radicals:

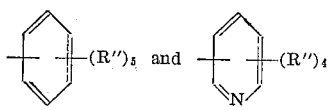

where R″ is selected from the group consisting of hydrogen, vinyl, halogen and lower alkyl.

Representative conjugated dienes which can be copolymerized with any one of the above-mentioned trimethylene sulfides include:

1,3-butadiene,
isoprene,
2,3-dimethyl-1,3-butadiene,
1,3-pentadiene (piperylene),
2-methyl-3-ethyl-1,3-butadiene,
3-methyl-1,3-pentadiene,
2-methyl-3-ethyl-1,3-pentadiene,
2-ethyl-1,3-pentadiene,
1,3-hexadiene,
2-methyl-1,3-hexadiene,
1,3-heptadiene,
3-methyl-1,3-heptadiene,
1,3-octadiene,
2-chloro-1,3-butadiene,
3-butyl-1,3-octadiene,
3,4-dimethyl-1,3-hexadiene,
3-n-propyl-1,3-pentadiene,
4,5-diethyl-1,3-octadiene,
2-phenyl-1,3-butadiene,
2,3-diethyl-1,3-butadiene,
2,3-di-n-propyl-1,3-butadiene,
2-methyl-3-isopropyl-1,3-butadiene, and the like, and mixtures thereof.

Representative vinyl-substituted compounds coming within the scope of Formula II which can be copolymerized with any one of the above-mentioned trimethylene sulfides, or copolymerized with the latter and any one of the above-mentioned conjugated dienes, include: styrene, alpha-methylstyrene, 4-methylstyrene, 3-chlorostyrene, 4-ethylstyrene, 3-n-butylstyrene, 4-isopropylstyrene, 4-bromostyrene, 4-tert-butylstyrene, and divinyl benzene; unsaturated aliphatic carboxylic acids, such as acrylic acid, methacrylic acid, ethacrylic acid, propyacrylic acid, 2-chloroacrylic acid, etc.; nitriles, such as acrylonitrile, ethacrylonitrile, etc.; the corresponding amides, such as acrylamide, methacrylamide, ethacrylamide, etc.; esters, such as methyl acrylate, ethyl acrylate, propyl acrylate, butyl acrylate, methyl methacrylate, ethyl methacrylate, propyl methacrylate, butyl methacrylate, methyl ethacrylate, ethyl ethacrylate, methyl 2-chloroacrylate; heterocyclic nitrogen compounds, such as 2-vinylpyridine, 2-methyl-5-vinylpyridine, etc.; and the like.

Where the trimethylene sulfide is copolymerized with one or more vinyl-substituted comonomers, such as 1,3-butadiene and styrene, the copolymers formed can be random copolymers or block copolymers, or combinations of the two within the same molecule, that is, a block copolymer where one of the blocks is a random copolymer. In preparing the random copolymers, the various monomers are all charged at the same time to the polymerization reactor. In preparing the block copolymers, one or more of the vinyl-substituted comonomers can be charged initially, allowing the same to polymerize, and then the trimethylene sulfide can be charged, allowing the latter to polymerize. Alternatively, the trimethylene sulfide can be charged and polymerized first and the vinyl-substituted comonomer(s) thereafter, to form block copolymers. In any case, where such random or block copolymers are prepared, the trimethylene sulfide will usually make up from 10 to 90 weight percent of the copolymer, and where the vinyl-substituted comonomers make up the rest of the copolymer.

Antioxidants, pigments, extenders, plasticizers, cross linking agents, and other additives can be incorporated into the polymers and the polymers fabricated, shaped or formed as mentioned above.

The objects and advantages of this invention are further illustrated in the following examples, but it should be understood that the various materials, conditions and other conditions recited in these examples should not be construed to unduly limit this invention.

EXAMPLE I

A polymer of trimethylene sulfide or poly(trimethylene sulfide), prepared by the polymerization of trimethylene sulfide in cyclohexane using n-butyllithium as the polymerization catalyst, is dissolved in N-methylpyrrolidone and solution spun into a fiber. This fiber is then cold drawn at a draw ratio of approximately 4 to 1, yielding a fiber of high tensile strength, but having a melting point of only 65° C. As the fiber leaves the cold drawing rolls, it is passed directly through an acetic acid bath containing sufficient hydrogen peroxide to provide 4 mols of hydrogen peroxide per gram atom of sulfur present in the polymer. The bath temperature is maintained at approximately 50° C., and the path of the fiber through the bath is such that the residence time in the oxidation zone is approximately 25 minutes. The resulting fiber of poly(trimethylene sulfone) is then withdrawn continuously from the oxidation zone, washed with water, dried and woven or knitted into cloth. This fiber has a high tensile strength, and melts with decomposition at about 300° C.

EXAMPLE II

In this example, a number of poly(trimethylene sulfide) samples were oxidized to show modification of the polymer by such treatment. The trimethylene sulfide polymer used in these runs was formed by polymerizing trimethylene sulfide in the presence of n-butyllithium, using cyclohexane as the polymerization diluent. The polymer itself melted at 65° C., and when molded into a film at 120° C. and 18,000 p.s.i. it had a tensile strength of 4110 p.s.i.

In run 1, 20 grams of the above-described poly(trimethylene sulfide) was dissolved in 180 grams of methylsulfolane at steam bath temperature. To the polymer solution, 30 grams of 30 percent aqueous hydrogen peroxide solution was added while stirring over a 30 minute period. The oxidation reaction was exothermic, causing a temperature rise to about 110° C. The temperature was maintained at no greater than 110° C. by cooling. The polymer precipitated at the end of the hydrogen peroxide addition, and stirring and heating at steam bath temperature was continued for 30 minutes. The polymer was then allowed to stand over a weekend, after which an additional 100 ml. of methylsulfolane was added to the reaction vessel, and the contents were heated while stirring. The polymer did not dissolve at 340° F. When 300 ml. of water was added, the polymer dissolved. The water present was evaporated on a steam bath with water pump vacuum, and the polymer then precipitated from the methylsulfolane. Benzene in the amount of 200 ml. was then added, and the polymer filtered out, washed with benzene, and dried under vacuum at 80° C. overnight. Elemental analysis of the polymer, shown below in Table I, indicated that the polymer was then in sulfoxide form. This polymer was water soluble and melted with decomposition at about 215° C.

In run 2, 20 grams of the poly(trimethylene sulfide) and 180 grams of acetic acid were heated on a steam bath while stirring. The polymer did not dissolve. Aqueous hydrogen peroxide in the amount of 30 grams of 30 percent and 200 cc. of methylsulfolane were added after which an additional 37 grams of the hydrogen peroxide solution was added. The resulting mixture was heated for 30 minutes at steam bath temperature and was then allowed to stand overnight. The following morning, a test showed some hydrogen peroxide still present in the reaction mixture, so the mixture was heated on a steam bath for 3 hours and 20 minutes, after which ethyl mercaptan was added to kill any remaining traces of unreacted hydrogen peroxide. The polymer was filtered out while hot and washed three times with distilled water in a Waring Blendor. The polymer was dried overnight under vacuum at 100° C. The weight of polymer recovered was 27.8 grams, and this polymer did not melt at 275° C., yet did melt with decomposition at 310° C. Elemental analysis of this material, given below in Table I, showed that the polymer was in the sulfone form. This polymer was insoluble in hot dimethyl sulfoxide, insoluble in hot N-methylpyrrolidone, insoluble in hot dimethylformamide, and soluble in cold sulfuric acid.

In run 3, 20 grams of the poly(trimethylene sulfide) was dissolved in 280 grams of methylsulfolane at about 275° F. Over about a 10 minute period, 7.5 grams of 30 percent aqueous hydrogen peroxide was added to the mixture, after which the solution was allowed to cool to room temperature while stirring. The resulting polymer solution was poured into 500 ml. water while stirring, causing the polymer to precipitate. The polymer was then washed three times in a Waring Blendor with distilled water, after which the polymer was dried overnight at 80° C. under water pump vacuum. The yield of dry polymer was 20.2 grams, melting at about 120° C. This polymer was a rubbery, flexible material which was soluble in N-methylpyrrolidone. A film molded from this material at 125° C. had a tensile (at break) of 1873 p.s.i. The elemental analysis of this material, given below in Table I, indicated that at least a portion of the sulfur atoms had been converted to the sulfoxide form.

In run 4, the method of run 1 was repeated, except that the amount of hydrogen peroxide solution employed was 52.5 grams. The resulting polymer, indicated by elemental analysis to contain some sulfoxide groups and some sulfone groups, decomposed at about 240° C. The elemental analysis for this polymer is given below in Table I.

TABLE I

| Run | Moles H₂O₂ used per gram atom of S in polymer | Melting point of oxidized polymer, ° C. | Elemental analysis of oxidized polymer, wt. percent | | | |
|---|---|---|---|---|---|---|
| | | | C | H | S | O |
| 1 | 0.982 | 215 | 38.7 | 6.9 | 34.3 | 17.1 |
| 2* | 2.18 | 310 | 35.2 | 6.1 | 32.4 | 27.4 |
| 3 | 0.245 | 120 | 47.7 | 8.0 | 40.6 | 10.5 |
| 4 | 1.72 | 240 | 36.5 | 6.2 | 32.2 | 30.7 |

* The oxidized polymer of this run was more stable in air at 175° C. than the oxidized polymers of the other runs.

For purposes of comparison, the theoretical elemental analyses of poly(trimethylene sulfide) and its oxidized forms are set forth in Table II.

TABLE II

| | Theoretical elemental analysis, wt. percent | | | |
|---|---|---|---|---|
| | C | H | S | O |
| Poly(trimethylene sulfide) | 48.7 | 8.1 | 43.2 | 0 |
| Poly(trimethylene sulfoxide) | 40.0 | 6.66 | 35.6 | 17.76 |
| Poly(trimethylene sulfone) | 33.95 | 5.66 | 30.2 | 30.2 |

Various modifications and alterations of this invention will become apparent without departing from the scope and spirit of this invention and it should be understood that this invention is not to be limited unduly to that set forth herein for illustrative purposes.

I claim:

1. A process comprising contacting a shaped article of a trimethylene sulfide polymer with nascent oxygen, whereby at least a portion of the sulfur groups in said polymer is converted to sulfoxide groups and/or sulfone groups.

2. A process comprising fabricating a shaped article of a polymer of a trimethylene sulfide having the general formula:

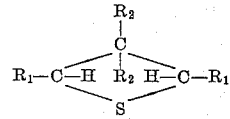

where R₁ and R₂ are radicals selected from the group consisting of hydrogen, alkyl, aryl, and cycloalkyl radicals, and combinations of such radicals, contacting said shaped article with an oxidizing agent which yields nascent oxygen, said oxidizing agent converting at least a portion of the sulfur groups in said polymer to sulfoxide groups and/or sulfone groups and recovering the resulting oxidized shaped article.

3. The process according to claim 2, wherein said oxidizing agent is selected from the group consisting of hydrogen peroxide, performic acid, peracetic acid, perbenzoic acid, and hypochlorous acid.

4. The process according to claim 2, wherein said oxidizing agent is hydrogen peroxide.

5. The process according to claim 2, wherein said contacting step is carried out in a diluent.

6. The process according to claim 2, wherein said oxidizing agent is hydrogen peroxide and said contacting step is carried out in acetic acid as a diluent.

7. The process according to claim 2, wherein said polymer is poly(trimethylene sulfide).

8. A process comprising fabricating a shaped article of poly(trimethylene sulfide), contacting said shaped article with hydrogen peroxide in acetic acid as a diluent, and recovering the resulting oxidized article.

9. The oxidized shaped article prepared according to claim 1.

10. A process according to claim 2 wherein said polymer of a trimethylene sulfide is copolymerized with a vinyl-substituted monomer having 4 to 12 carbon atoms per molecule, said vinyl-substituted monomer having a general formula

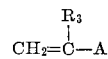

where $R_3$ is selected from a group consisting of hydrogen, alkyl, and chloro, and A is selected from the group consisting of carboxy, cyano, carbonyl, carboalkoxy, and radicals having the general structure

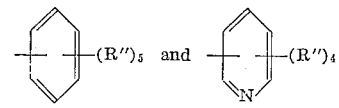

where R'' is selected from the group consisting of hydrogen, vinyl, halogen and lower alkyl.

References Cited by the Examiner

Tarbell et al., Chem. Reviews, vol. 49, August–December 1951, p. 22 relied on.

JOSEPH L. SCHOFER, *Primary Examiner.*

D. K. DENENBERG, *Assistant Examiner.*